G. A. DEARDORFF.
ROAD MAP FOR AUTOMOBILES.
APPLICATION FILED JULY 8, 1912.
1,068,112. Patented July 22, 1913.
2 SHEETS—SHEET 1.
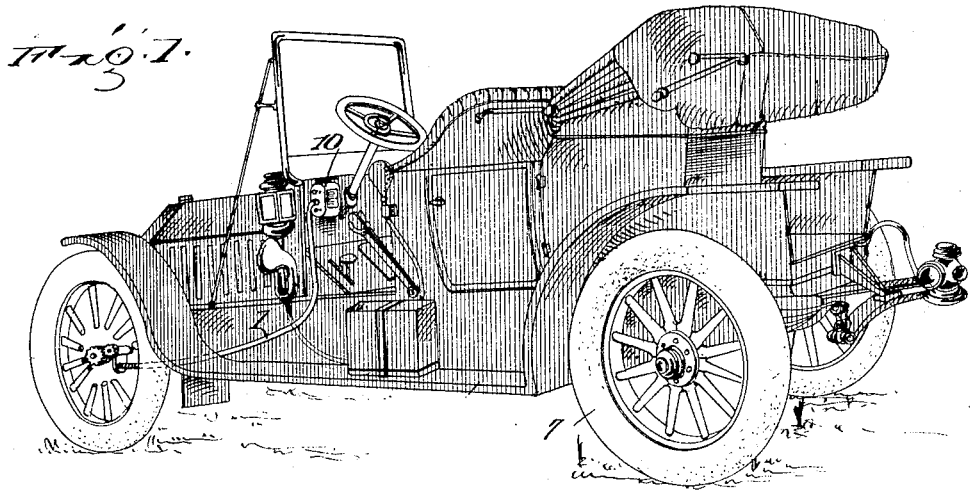
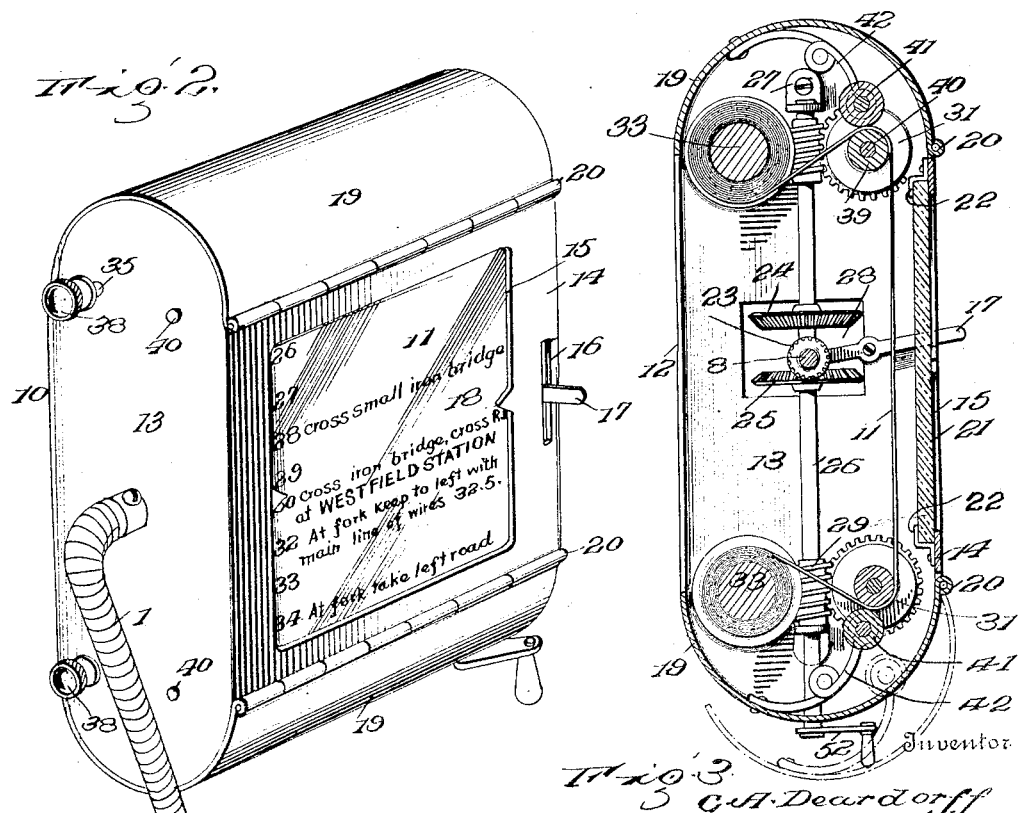

G. A. DEARDORFF.
ROAD MAP FOR AUTOMOBILES.
APPLICATION FILED JULY 8, 1912.
1,068,112.
Patented July 22, 1913.
2 SHEETS—SHEET 2.
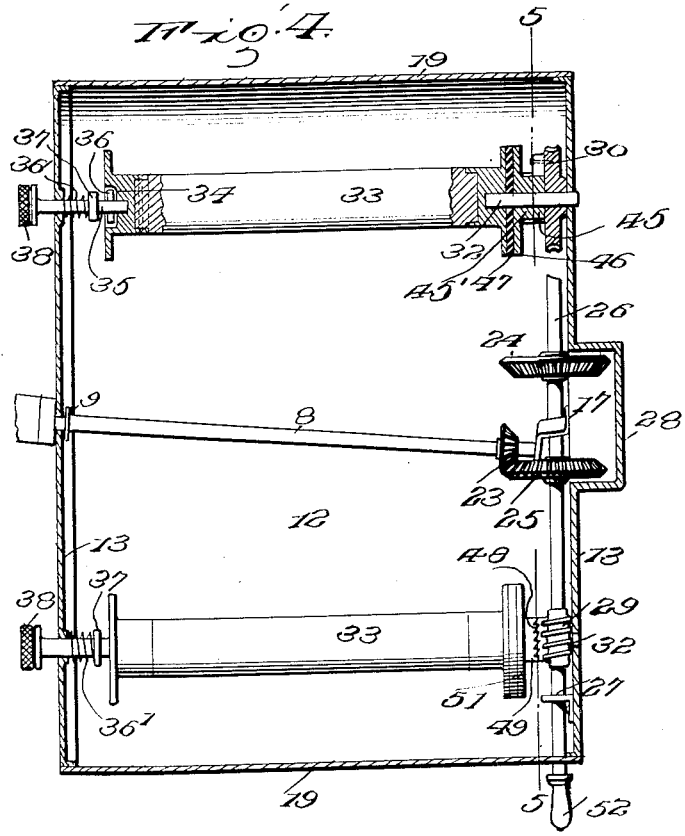
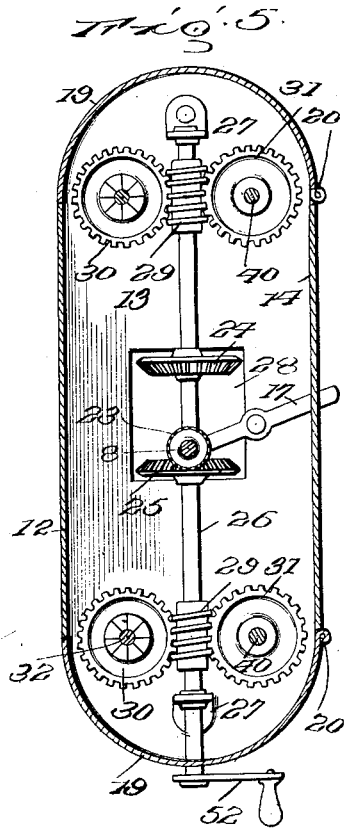
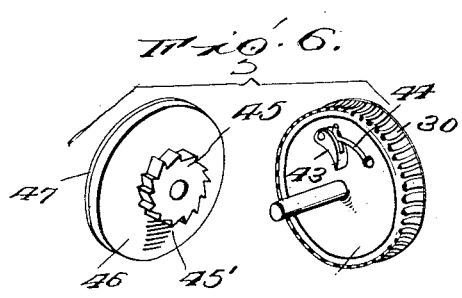
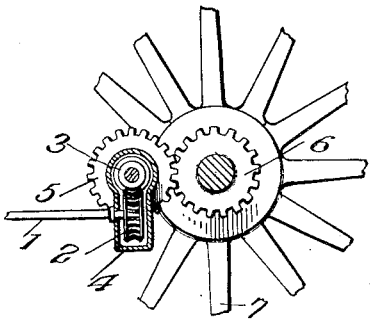
Inventor
G. A. Deardorff
Witnesses
By
Attorneys

UNITED STATES PATENT OFFICE.

GEORGE A. DEARDORFF, OF OCCOQUAN, VIRGINIA, ASSIGNOR OF ONE-FOURTH TO HOWARD M. TAYLOR, OF CANAL DOVER, OHIO.

ROAD-MAP FOR AUTOMOBILES.

1,068,112.

Specification of Letters Patent.

Patented July 22, 1913.

Application filed July 8, 1912. Serial No. 708,334.

*To all whom it may concern:*

Be it known that I, GEORGE A. DEARDORFF, citizen of the United States, residing at Occoquan, in the county of Prince William and State of Virginia, have invented certain new and useful Improvements in Road-Maps for Automobiles, of which the following is a specification.

This invention relates to road maps for automobiles, and has for its object the provision of a simple and efficient mechanism which may be mounted upon the body of an automobile and actuated by the wheels thereof whereby the chauffeur may be informed at all times of his location and the direction in which he should travel to reach a desired point.

The invention seeks to provide an apparatus for the purpose stated which will occupy very little space and which may be readily adjusted to cause a map or indicator to travel in either direction according to the movement of the automobile and which may be rapidly and easily set by hand so that any desired starting point may be brought in proximity to the view-opening.

The invention also seeks to provide a novel construction and arrangement of parts whereby the differences in the diameters of the web rolls may be automatically compensated for by the gearing connected with the web carrying rolls.

All these stated objects, and such other objects as will incidentally appear from the following description, are attained in the use of an apparatus of the type illustrated in the accompanying drawings, and the invention consists in certain novel features which will be more particularly pointed out in the appended claims.

In the annexed drawings:—Figure 1 is a perspective view of an automobile showing my improved road map applied thereto; Fig. 2 is an enlarged perspective view of the road map or route indicator; Fig. 3 is a vertical longitudinal section of the indicating apparatus; Fig. 4 is a vertical transverse section of the same; Fig. 5 is a vertical section taken on the line 5—5 of Fig. 4; Fig. 6 is a detail view of one form of friction clutch or slip gearing which may be applied to the end of a web-carrying roller; Fig. 7 is a detail view showing the connection whereby the device is actuated from the wheel of the automobile.

In carrying out my invention, I employ a flexible shaft 1 which has one end equipped with a worm pinion 2 meshing with a worm 3 housed within a casing 4 supported in any suitable manner adjacent an axle of the vehicle, said worm 3 having its shaft extended from the housing and equipped with a pinion 5 meshing with a pinion 6 on the axle and rigid with the wheel 7. It will be readily understood that as the automobile travels over the road the rotation of the wheel 7 will be transmitted through the described gearing to the flexible shaft 1 which will be thereby rotated to actuate the map or road indicator upon the dash-board of the vehicle. The flexible shaft 1 terminates in a spindle or unyielding shaft 8 which has a loose bearing at 9 in one side of the casing 10 containing the web 11 upon which is printed or otherwise displayed a memorandum of the places passed in traveling between two given points as well as a statement of the mileage and directions as to the turns which should be made to reach the desired destination.

The casing 10 consists of a back plate 12, adapted to rest against the automobile dash-board, and side plates 13 integral with or secured rigidly to the said back plate. The side plates are projected beyond the upper and lower edges of the back plate and have semi-circular ends. The front of the casing consists of a plate or frame 14 containing a view opening 15 and a longitudinal slot 16 near one edge, the said slot 16 accommodating a shifting lever 17 and the side edges of the view opening 15 being equipped with pointers 18, as shown. The ends of the casing consist of curved or semi-cylindrical plates 19 which are connected to the upper and lower edges of the frame or plate 14 by spring hinges, indicated at 20, whereby the said curved plates or hoods may be turned outwardly to clear the edges of the side walls or plates 13 and then released to snugly engage the same. It will thus be seen that extraneous locking devices are unnecessary and the spring hinges 20, together with the semi-cylindrical formation of the members 19, will hold the front and ends of the casing in engagement with the back and side walls or plates so that the casing will not be apt to collapse or be accidentally dismembered. The view opening is preferably glazed, a pane of glass 21 being shown supported by flanges or ledges 22 on the inner surface of the front plate 14 of the frame, although such construction is not indispensable.

The shifting lever 17 is fulcrumed upon the end wall of the casing and projects through the slot 16, as before stated. The inner end of this lever constitutes a support or bearing for the free end of the shaft 8, and a bevel pinion 23 is fixed on the shaft 8 adjacent the end thereof and is adapted to engage one of the bevel gears 24 or 25 or remain in a neutral position between the same, accordingly as the lever is shifted to one side or the other or permitted to remain at an intermediate point. These bevel gears 24 and 25 are fixed upon a shaft 26 which is journaled in suitable bearings 27 on the inner face of the adjacent end wall 13, and the said end wall is provided with an offset 28 to accommodate the said gear wheels. The shaft 26 is disposed in the central vertical plane of the casing, as clearly shown in Fig. 5, and near its ends is formed or equipped with worms 29, as shown. These worms mesh with worm gears 30 and 31 which are disposed at opposite sides of the shaft, the gears 30 being mounted loosely on stub-shafts 32 which are journaled in notches or other bearings formed in the side wall 13, as will be readily understood. The stub-shafts have their inner ends engaging sockets formed in the adjacent ends of the web-carrying rolls or drums 33 to which the ends of the web 11 are secured, the said web being wound upon one of said rollers or drums and unwound from the other as the apparatus is operated.

The ends of the web-carrying rollers or drums opposite the stub-shafts 32 are constructed with sockets 34 which are engaged by stub-shafts 35 having lugs or other engaging surfaces 36 whereby the drums or rollers and the said stub-shafts will be caused to rotate together. These stub-shafts 35 are pressed inwardly toward the web-carrying rollers or drums by springs 36' disposed between the side walls of the casing and a stop or shoulder 37 on the shaft, and the ends of the shafts beyond the casing are provided with milled heads or other form of operating handles 38. The web 11 passes from the web-carrying rollers or drums to rollers 39 which are rigid with shafts 40 journaled in the side walls of the casing and each having a worm wheel 31 fixed upon one end. The rollers 39 are of such diameter that the portion of the web extending between the same will be brought close to the view opening in the front of the casing and be maintained parallel with the plane of said opening. As the web travels, therefore, from one drum to the other, the inscriptions and directions appearing upon the web may be read through the view opening so that the vehicle may be properly steered and the course of the same determined. The several elements of the actuating gearing will be so proportioned that the travel of the web will be commensurate with the travel of the automobile and consequently the inscription or other matter appearing upon the web directly in line with the indicating points 18 will designate the exact location of the vehicle and inform the chauffeur whether he should continue straight ahead or turn to one side. The frictional contact between the web and the guide and drive rollers 39 and the resistance offered by the wound portion of the web to the unwinding of the same will tend to hold the web smooth and taut so that the inscriptions thereon may be easily and accurately read, but to further insure the taut condition of the web at all times, I provide presser rollers 41 which are carried by spring supports 42 secured upon the inner side of the semi-cylindrical portions 19 of the casing and are so located as to be brought immediately adjacent the drive rollers 39 when the said semi-cylindrical members 19 are swung into position, as clearly shown in Fig. 3. The web will therefore be passed between the drive rollers and the said presser rollers so as to be held firmly to the drive rollers and consequently maintained in a taut condition at all times, while it will be permitted to travel freely and consequently not be apt to be torn or damaged by the pull exerted thereon by the operating mechanism.

It will be noted that the worm wheels 30 and 31 are both in mesh with a worm 29 and actuated simultaneously thereby. The speed of the worm wheels will consequently be the same and therefore the web-carrying roll or drum and the adjacent drive roller 39 will rotate at the same speed and tend to feed the web at the same rate. As the web is wound, however, the peripheral speed of the web-carrying roll or drum is increased by the lapping of the web thereon, and as the web is unwound the peripheral speed of the same and the web-carrying drum will decrease so that the web will tend to travel at different rates adjacent the different drums. To prevent the web being damaged by this condition and to compensate for the difference in speed between the drive rollers and the adjacent web-carrying drums, I provide a compensating or slip connection between the drums and the worm wheels 30 which actuate the same. In Fig. 6 and at the upper end of the casing in Fig. 4, I have shown the worm wheel as having a pawl 43 pivoted upon one face and engaged by a spring 44 to be held in engagement with a ratchet disk 45 mounted loosely on the stub-shaft between the worm wheel and the end of the web-carrying roller or drum. This ratchet wheel or disk is formed on the end of a sleeve or barrel 45' which has its inner end expanded to provide a disk 46 immediately adjacent the end of the drum or web-carrying roller, and the face of the said disk is covered with rubber, leather, or some other friction-creating material, indicated at 47, which will bear against the end of the drum or web-carrying roller so as to frictionally engage the same and cause it to rotate when the worm wheel 30 is actuated. When the gearing is driven in the direction to wind the web upon the drum, the pawl carried by the worm wheel will engage the ratchet disk and positively actuate the same so that the drum will be rotated against the tension of the web and wind the same. When the mechanism is being operated to unwind the web, the drum will rotate and the frictional engagement between the same and the ratchet disk will cause the said disk to move at the same speed as the drum and pass under the pawl so that the worm wheel will be free to move under the slower speed of the driving mechanism without positively actuating the drum. The spring 36, acting upon the stub-shaft 35 and, through the same, on the end of the web-carrying drum or roller, forces the said drum against the friction disk 47 so that the engagement of the said members will be maintained at all times. While this frictional engagement will transmit the motion between the said members, it will at the same time permit relative movement thereof so that the worm wheel cannot impart such movement to the drum as will exert tearing strain upon the web or unwind the same so rapidly as to permit it to lie loosely in the casing and so tend to become caught in some of the adjacent parts and thereby damaged.

In the lower portion of Fig. 4, I have shown the compensating gearing as comprising a clutch member 48 formed on the hub of the worm wheel 30 and adapted to be engaged by a clutch member 49 yieldably held in engagement therewith by the spring 36' and carrying the friction disk 51 at its inner end adapted to engage the end of the adjacent drum or web-carrying roller, as will be readily understood.

The lower end of the driving shaft 26 may be provided with a crank handle 52, so that, by shifting the bevel pinion 23 to a neutral position the shaft may be rotated to rewind or re-adjust the map whenever such attention is needed. The milled heads 38, however, upon the stub-shafts 35 furnish a more convenient and rapid means of accomplishing this re-adjustment of the web, inasmuch as it permits the operator to rotate the drums directly instead of through the gearing which, as will be readily understood, is so arranged as to reduce the speed at which the map or web will travel.

It is thought the operation of my device will be readily understood from the foregoing description, taken in connection with the accompanying drawings. As the vehicle travels, the rotation of the traction or carrying wheels will be transmitted directly to and through the flexible shaft 1 so that the shaft 8 will be rotated and consequently the driving shaft 26 will be actuated so that the worms on said shaft will positively rotate the worm wheels 30 and 31 engaged thereby. The said worm wheels will rotate the web-carrying drums and drive rollers adjacent the same in opposite directions and the web will, therefore, be trained around the said rollers so as to pass obliquely between the same and consequently be moved in the direction of its length, as will be readily understood on reference to Fig. 3. The web will consequently be caused to travel across the view opening in the front of the casing and may, therefore, be inspected by the chauffeur at all times. When the end of the line is reached, the lever 17 is shifted so as to bring the pinion 23 into mesh with the gear wheel 24 or 25 which was previously disengaged and the device will then, of course, be ready to accurately inform the chauffeur of the points passed on the return trip. The pinion 23 may be placed in a neutral position between the gear wheels 24 and 25 while the vehicle is being turned preparatory to the return trip or it may be shifted to the opposite extreme of its adjustment and the web subsequently adjusted, so as to overcome the slight inaccuracy caused by the turning of the vehicle, by manually shifting the drums through the medium of the stub-shafts 35, as will be readily understood.

By my invention a very simple and efficient road map is produced, all of the operating parts of which are inclosed so as to be protected against the accumulation of dust or other foreign matter, and accuracy in the web is obtained by providing gearing which will positively feed the web during the travel of the vehicle, but, at the same time, will permit the actuating parts to compensate automatically for the increasing diameter of the web roll upon one drum and the decreasing diameter thereof upon the other drum. The casing is so constructed that the web and the parts carrying the same may be placed in position and the front and ends of the casing subsequently applied so as to inclose the said parts, and, as the presser rollers are carried by the ends of the casing and said ends are brought into position after the web is in place, it is not necessary to thread the web between coacting presser rollers and consequently the web may be very easily and quickly placed in its working position. The manner in which the web-carrying drums are supported not only provides means for compensating for the variation in the diameter of the web, but also permits the drum to be easily removed so that any desired map may be placed within the casing at any time, so that the chauffeur may easily provide a map corresponding to the intended journey.

While the device is intended primarily for use upon automobiles and is so illustrated and described, it is to be understood that the invention may be utilized on other types of vehicles and will be found advantageous on railroad cars or boats and other navigable vessels.

What I claim is:—

1. In a device for the purpose set forth, the combination of a casing, a pair of drums mounted therein, drive rollers mounted in the casing adjacent the drums, a web carried by the drums and passing over said drive rollers, a driving shaft disposed longitudinally of the casing, gearing connecting said shaft with the drums and the drive rollers, oppositely disposed gear wheels on said shaft, a lever fulcrumed within the casing, a shaft carried by the end of said lever, a pinion on said shaft adapted to engage either gear wheel on the driving shaft as the said lever is oscillated, and means for actuating the shaft carrying said pinion.

2. In a device for the purpose set forth, the combination of a back, sides rigid therewith and having semi-circular ends projecting beyond the upper and lower edges of the back, web-carrying drums journaled in said sides adjacent the ends thereof, drive rollers journaled in the sides adjacent the drums, a front plate adapted to fit against the edges of the sides, semi-cylindrical hoods hinged to the upper and lower edges of the front plate and adapted to fit around the projected semi-circular ends of the sides, and presser rollers carried by the said hoods and adapted to coöperate with the driving rollers whereby when the hoods are moved into engagement with the ends of the sides the front plate will be held in position and the presser rollers brought into operative relation to the drive rollers.

3. In a device for the purpose set forth, the combination of a back, sides rigid therewith and having semi-circular ends projected beyond the upper and lower edges of the back, a front plate adapted to fit against the front edges of the sides, semi-cylindrical hoods hinged to the upper and lower edges of the front plate and adapted to engage over the projected ends of the sides whereby to hold the front plate against the sides, and indicator mechanism supported by and between the sides.

4. In a device for the purpose set forth, the combination of a casing, driving rollers mounted in and extending between the sides of the casing adjacent the ends thereof, stub-shafts fitted in the sides of the casing adjacent the said driving rollers, drums having sockets in both their ends engaging the said stub-shafts, the stub-shafts at one side of the casing being provided with means for effecting a driving engagement with the adjacent end of the drum, means for yieldably holding said last named stub-shafts toward the drum, a driving wheel fitted loosely upon each stub-shaft at the opposite ends of the drums, a frictional coupling between the said drive wheels and the adjacent ends of the drums, a driving shaft mounted on the side of the casing and geared to the said driving wheels and to the said driving rollers, and means for rotating said shaft.

5. In a device for the purpose set forth, the combination of a casing, movable ends therefor, drums rotatably supported by the sides of the casing adjacent the ends thereof, drive rollers mounted in the sides of the casing adjacent said drums, a driving shaft mounted on one side of the casing and geared to the said driving rollers and the said drums, means for rotating said shaft, a web having its ends secured to the drums and its intermediate portion passing over the said driving rollers, and presser rollers carried by the movable ends of the casing and adapted to bear upon that portion of the web passing over the driving rollers.

In testimony whereof I affix my signature in presence of two witnesses.

GEORGE A. DEARDORFF. [L. S.]

Witnesses:
J. D. YOAKLEY,
R. W. BISHOP.